(12) United States Patent
Cheng et al.

(10) Patent No.: US 6,605,207 B2
(45) Date of Patent: Aug. 12, 2003

(54) BAYERITE ALUMINA CLAD ZEOLITE AND CRACKING CATALYSTS CONTAINING SAME

(75) Inventors: Wu-Cheng Cheng, Ellicott City, MD (US); Xinjin Zhao, Woodbine, MD (US); Philip Stephen Deitz, Baltimore, MD (US)

(73) Assignee: W. R. Grace & Co. - Conn., Columbia, MD (US)

( * ) Notice: Subject to any disclaimer, the term of this patent is extended or adjusted under 35 U.S.C. 154(b) by 181 days.

(21) Appl. No.: 09/833,604

(22) Filed: Apr. 13, 2001

(65) Prior Publication Data

US 2002/0185412 A1 Dec. 12, 2002

(51) Int. Cl.[7] .................................. B01J 29/08
(52) U.S. Cl. ................ 208/120.01; 502/63; 502/64; 502/73; 502/79; 502/65; 208/118
(58) Field of Search ............... 502/65, 63, 64, 502/73, 79; 208/120.01, 118

(56) References Cited

U.S. PATENT DOCUMENTS

| | | | | |
|---|---|---|---|---|
| 4,086,187 A | * | 4/1978 | Lim et al. | 502/68 |
| 4,206,085 A | * | 6/1980 | Lim et al. | 502/68 |
| 4,938,863 A | * | 7/1990 | Degnan et al. | 208/120.25 |
| 5,147,836 A | * | 9/1992 | Cheng et al. | 502/64 |
| 5,851,378 A | * | 12/1998 | Vogt et al. | 208/108 |
| 6,200,464 B1 | * | 3/2001 | van Houtert et al. | 208/119 |

FOREIGN PATENT DOCUMENTS

| | | | |
|---|---|---|---|
| EP | 499 799 | * | 8/1992 |
| EP | 762 935 | * | 4/1998 |

* cited by examiner

Primary Examiner—Tom Dunn
Assistant Examiner—Christina Ildebrando
(74) Attorney, Agent, or Firm—Howard J. Troffkin; Charles A. Cross

(57) ABSTRACT

A catalyst suitable for use in fluid catalytic cracking of petroleum feedstock in the form of particulate of crystalline zeolite having a coating on it6s surface comprising bayerite phase alumina.

49 Claims, 2 Drawing Sheets

BAYERITE ALUMINA CLAD ZEOLITE AND CRACKING CATALYSTS CONTAINING SAME

FIELD OF THE INVENTION

The present invention is directed to fluid catalytic cracking catalysts comprising zeolite particles which are coated with bayerite alumina, and to FCC processes which utilize the subject catalyst.

BACKGROUND OF THE INVENTION

Catalytic cracking is a petroleum refining process which is applied commercially on a very large scale. A majority of the refinery gasoline blending pool in the United States is produced using the fluid catalytic cracking (FCC) process. In the catalytic cracking process heavy hydrocarbon fractions are converted into lighter products by reactions taking place at elevated temperature in the presence of a catalyst, with the majority of the conversion or cracking occurring in the vapor phase. The feedstock is thereby converted into gasoline, distillate and other liquid cracking products as well as lighter gaseous cracking products of four or less carbon atoms per molecule. The gas partly consists of olefins and partly of saturated hydrocarbons.

Cracking catalysts used in FCC processes are fine porous powders composed of oxides of silica and aluminum. Other elements may be present in very small amounts. Either Bronsted or Lewis acid sites associated with the aluminum are believed to initiate and accelerate carbocation reactions that cause molecular size reduction of the petroleum oils under the FCC reactor conditions. When aerated with gas, the powder attains a fluid-like state that permits its circulation through the various FCC process zones.

During the cracking reactions some heavy material, known as coke, is deposited onto the catalyst. This reduces the activity of the catalyst. After removal of occluded hydrocarbons from spent cracking catalyst, regeneration is accomplished by burning off the coke to restore catalyst activity. The three characteristic process zones of the FCC process are composed of: a cracking step in which the hydrocarbons are converted into lighter products, a stripping step to remove hydrocarbons adsorbed on the catalyst and a regeneration step to burn off coke from the catalyst. The regenerated catalyst is then reused in the cracking step.

Various attempts have been made to improve the performance of FCC catalysts. These catalysts have been formed from mixtures of zeolites with an active matrix material, such as various forms of alumina, or have been coated. For example, JP laid-open application SHO 58-112,051 discloses the formation of a zeolite, which has been coated with a metallic oxide prior to incorporation into the catalyst composition. The zeolite is dispersed in an aqueous acidic solution of the metal salt and then treated with ammonia water to raise the pH to about 9 causing the metal to deposit as the hydroxide on the surface of the zeolite. The resultant coating is a relatively amorphous alumina.

In U.S. Pat. No. 4,332,699, a pseudo-boehmite alumina was coated on the surface of zeolite particles via a low pH process. The crystallinity of zeolite has been deemed susceptible to damage by subjecting it to very high pH conditions. Thus, precipitation processes have been done under controlled pH values of 7–9 more normally 7 to 8. Under these conditions the alumina coatings are of boehmite or pseudo-boehmite structure.

FCC catalysts have also been formed from zeolites which are augmented by active matrix materials of aluminas. For example, U.S. Pat. No. 5,168,086 discloses the mixing of bayerite/eta alumina particles into the cracking catalyst matrix to improve its tolerance to nickel-containing feedstocks. The zeolite is mixed with the alumina along with other conventional matrix components and then calcined to form the catalyst particles.

In cracking there is a desire to optimize output. The scale of cracking is such that even what appears to be a modest improvement may have a large effect on a refinery's profitability. There has been a desire to tailor catalysts to achieve specific refinery objectives (e.g., maximizing output of certain types of molecules). For example, refiners often desire to increase or maximize their output of light cycle oil (LCO). They also have the desire to minimize the amount of uncracked "bottoms", especially where the feedstock is heavy feed, such as resids. While refineries wish to achieve these various goals, they also want to avoid/minimize the output of coke and hydrogen from the FCC process.

Cracking catalysts must be able to crack the range of constituents in a feedstock to achieve the desired output. In this context, the cracking catalyst itself may contain various components ranging from zeolites, active matrix materials (e.g., alumina, relatively inactive matrix materials (e.g., clay) to binders (e.g., sols). Cracking catalysts, especially for FCC processes are necessarily constrained as to their particle size by virtue of the fact that the catalyst particles must be adequately fluidizable in the process. An additional constraint is that the catalyst must be attrition resistant. The requirement for attribution resistance generally means that a significant amount of clay and binder must be present in the catalyst particle. Thus, there is only limited room in the catalyst particle for those components that are responsible for the majority of the cracking function (i.e., zeolite/active matrix).

While modern cracking catalysts have made significant strides to improve catalytic performance, there still is the need to provide catalysts which can exhibit improved cracking of heavy bottom materials or resids, without increasing the alumina content of the catalyst. Further, there is the need to provide a FCC catalyst which minimizes coke/hydrogen formation at a given bottoms cracking performance level.

SUMMARY OF THE INVENTION

Figure 1:
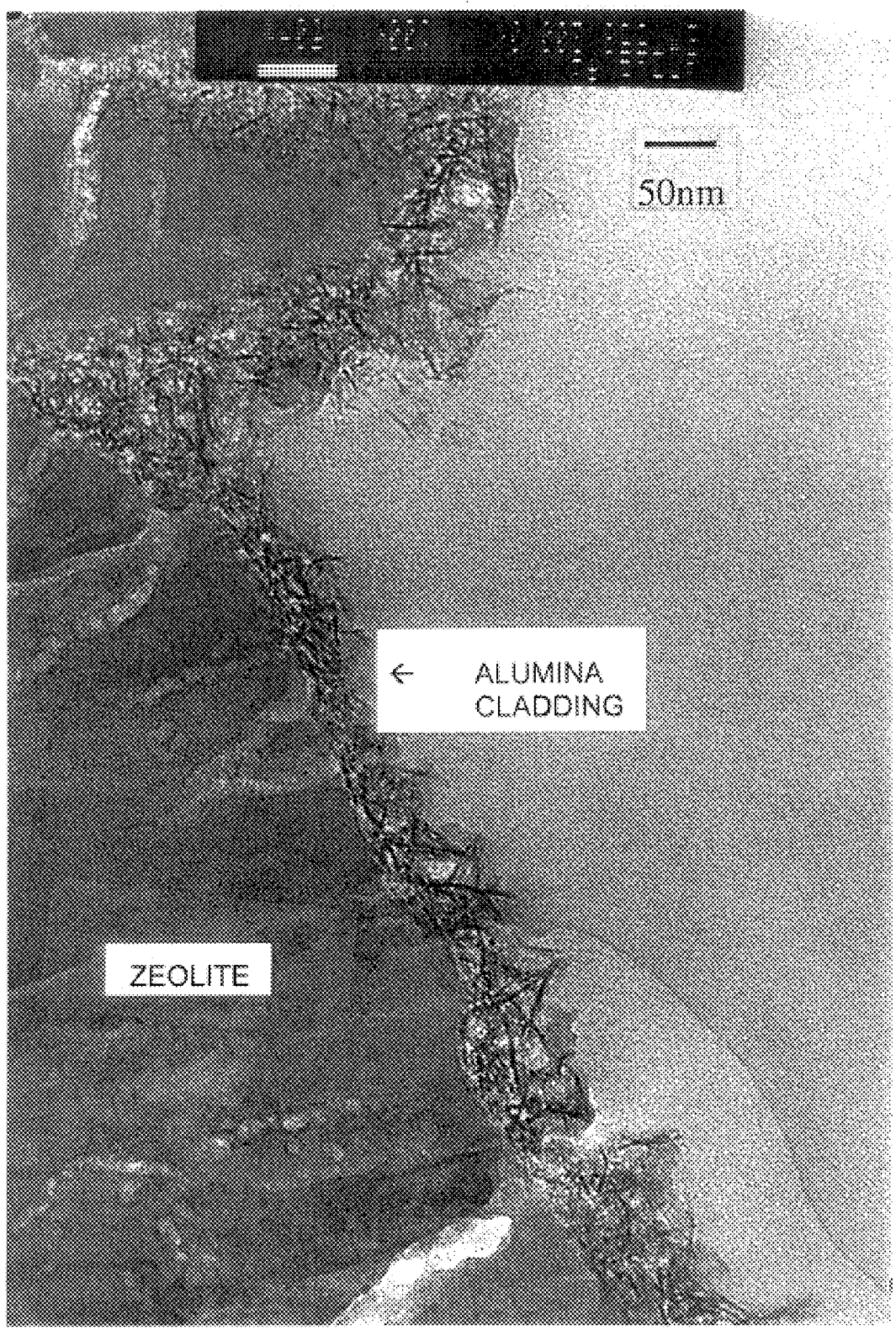
FIG. 1 is a picture of the product of Example 1 obtained by transmission electron microscopy (TEM) showing a portion of a zeolite particle (left dark portion of picture) with bayerite alumina cladding thereon. The scale of the picture is 1 cm represents 50 nm.

The present invention is directed to bayerite alumina-clad zeolite, hydrocarbon cracking catalysts containing said bayerite alumina-clad zeolite and FCC processes using said catalysts.

The subject bayerite alumina-clad zeolite is formed by dispersing zeolite in an aqueous solution of an aluminum ion source and treating the resultant dispersion with a strong base to cause the dispersion to have a pH of at least about 10. The resultant product is a bayerite alumina-clad zeolite composite product.

The present invention is further directed to FCC catalyst compositions comprising the subject bayerite alumina-clad zeolite dispersed in a silica or alumina type matrix. More specifically, the present FCC catalyst composition comprises fine particulates of bayerite alumina-clad zeolite, optionally additional active-matrix materials, along with conventional clays and binder.

Finally, the present invention is directed to FCC processes that utilize the present bayerite alumina-clad zeolite containing catalyst composition. The present FCC process is an improved hydrocarbon cracking process which minimizes coke formation and/or maximizes cracking of heavy "bottom" feedstock to produce higher yields of desired products.

DETAILED DESCRIPTION

The present invention is directed to bayerite alumina-clad zeolite particles, the process of forming said particles, the formation of hydrocarbon cracking catalysts using said bayerite alumina-clad zeolite as a major component, and catalytic hydrocarbon cracking processes using the present cracking catalyst.

It has been recognized that aluminas of various morphology may be added to catalytic cracking catalysts to improve the stability of the catalyst and to aid in coke/dry gas selectivity. Boehmite and pseudo-boehmite have been incorporated into the catalysts either as separate particles or as a coating on the zeolite molecular sieve of the catalyst. For example, U.S. Pat. Nos. 4,010,116 and 4,332,699 disclose pseudo-boehmite containing catalysts and Canadian Patent 1,117,511 describes an FCC catalyst which contains free boehmite in the catalyst composition.

Fluid cracking catalysts (FCC) are well known in the petroleum industry for forming desired gasoline and light oil materials, as well as $C_1$–$C_4$ hydrocarbon products, from petroleum feedstocks. The catalysts normally consist of a range of extremely small spherical particles. Commercial grades normally have average particle sizes ranging from about 25 to 100 microns, preferably from about 50 to about 75 microns. The cracking catalysts are comprised of a number of components, each of which is designed to enhance the overall performance of the catalyst. Some of the components influence activity and selectivity while others affect the integrity and retention properties of the catalyst particles. FCC catalysts are generally composed of zeolite, active matrix, clay and binder with all of the components incorporated into a single particle or are comprised of blends of individual particles having different functions.

The primary source of activity of cracking catalyst is zeolite. The term "zeolite" as used herein and in the appended claims indicates a natural or synthetic faujasite. Faujasite is a crystalline three-dimensional aluminosilicate of the zeolite mineral group which has ion-exchange capacity. These materials have pore openings of about 7 to 9 Å. Faujasite is known to occur naturally but, due to its scarcity it is formed synthetically in the sodium form by crystallization of sodium aluminate and sodium silicate (Standard Y type zeolite).

Although any zeolite suitable for hydrocarbon catalytic cracking can be used in the present invention, the preferred types of zeolites found useful herein are X and Y zeolite with the Y types being more preferred and the Standard Y type zeolite being most preferred. The Standard Y is formed in the manner described above and can be exchanged to remove a portion of the sodium by hydrogen (HY) and/or by exchange with rare earth metal ions (REY). In addition, an ultrastable Y zeolite (USY type) is formed by additional manufacturing techniques that increase the silicon/aluminum atomic ratio of the standard Y or REY zeolite by known process of dealumination. This is achieved by either steam calcination (e.g., CREY type) or chemical treatment. Each of the various types of zeolites can be used in forming the bayerite alumina-clad zeolite of the present invention.

The zeolite is clad with bayerite alumina by initially mixing an aqueous dispersion of zeolite with an aluminum ion source such as an acidic salt of aluminum as, for example, aluminum sulfate (alum) under acidic conditions. The resultant acidic dispersion is then contacted with a solution of a strong base in sufficient concentration to transform the pH of the dispersion to a value of at least 10 and preferably at least 10.5. The equilibrium pH of the resultant dispersion should be between 10 and 11.5, preferably between 10.0 and 10.5.

The zeolite dispersion containing the aluminum ion source should be introduced into an aqueous solution of a strong base having a sufficiently high pH to immediately transform the acidic dispersion to a pH of at least 10, preferably from at least 10 to about 10.5. In continuous processes, the equilibrium pH of the mixture of zeolite dispersion and base solution should be between 10 to 11.5, preferably between 10 to 10.5. This can be maintained by adjusting the rate of introduction of the acidic zeolite dispersion and basic solution.

The base can be any strong base which does not have an adverse effect on the zeolite structure. Preferred bases are alkali metal hydroxides, such as sodium hydroxide and the like, ammonium hydroxide, as well as alkali metal aluminates (preferred), such as sodium aluminate and the like.

The zeolite retrieved from the mixture has alumina clad on the surface of the zeolite particles. The alumina cladding is composed of at least 50 weight percent bayerite, preferably at least 75 weight percent and most preferably at least 90 weight percent bayerite alumina. The alumina cladding covers at least about 50% (preferably at least about 70% and most preferably at least about 90%) of the outer surface of the zeolite particles. The coating normally has a thickness of from about 5 nm to 100 $\mu$m, generally in the range of from about 10 nm to 75 nm. The degree of coating and the thickness can be adjusted by adjusting the concentration of aluminum salt in the initial aqueous zeolite dispersion.

The resultant coating can be studied by conventional techniques of TEM; STEM/DEX; and SEM to observe the coating and analyze its properties.

The determination of bayerite alumina may be masked by the spectra associated with zeolite. Therefore, the presence of bayerite alumina as part of the coating of the present coated zeolite shall be presumed if the precipitation of the coating occurs under conditions which, in the absence of zeolite, would produce a bayerite alumina from the same aluminum ion source solution. For example, precipitation of Bayerite from solution of sodium aluminate and aluminum sulfate is described in U.S. Pat. Nos. 5,304,526 and 6,165,351, the teachings of which are incorporated in there entirety by reference.

The formed bayerite alumina-clad zeolite can be separated from the mother liquor by known techniques. For example, the resultant material can be filtered and washed with water to remove salts and, optionally, dried to yield the particulate bayerite alumina-clad zeolite of the present invention. Where the bayerite-clad zeolite is to be further formed into FCC catalyst, isolating of dried particulate is not necessary.

The bayerite alumina-clad zeolites of the present invention have been found to be useful as components in hydrocarbon cracking catalysts, especially catalysts used in fluidized catalytic cracking units. The cracking catalyst compositions of the present invention may contain, in addition to the bayerite alumina-clad zeolite described above, a variety of components commonly used in conventional cracking catalyst. Such components include: 1) binders, such as, for example, silica sol, alumina, sol, silica-alumina sol and the like; 2) clays or clay derived matrix components such as, for example, kaolin, metakaolin, acid-reacted metakaolin and the like. The catalyst may, optionally, also contain active matrix components such as, particulate aluminas and the like; non-clad zeolites selected from the various known zeolites used in hydrocarbon cracking catalysts, such as, for example, ZSM-5, Zeolite-Beta and the like; and other known materials such as, for example, combustion promoters and the like.

The catalyst is formed by standard techniques which normally include the steps of mixing the present zeolite with clay and active matrix material. Binder is then added and the components are formed into an aqueous dispersion followed by drying and optionally calcining.

The cracking catalysts of the invention are particles which preferably contain about 10 to 80, preferably from about 20 to 60 weight percent of bayerite-clad zeolite based on the cracking catalyst particle composition. The cracking catalyst particles may also contain from 0 to 50, preferably from about 20 to 50 wt. % clay. The amount of binder used is preferably about 25 weight percent or less, more preferably about 10 to 20 weight percent. The cracking catalyst particles preferably have an average particle size suitable for use in conventional fluidized catalytic cracking processes, e.g., about 25 to 100 microns, preferably about 50–75 microns. The particles also preferably have good attrition resistance, e.g., Davison Attrition Index, DI, of about 1–20, more preferably about 1–10. The procedure for measurement of DI is well known in the art and has been published in several U.S. patents.

While the compositions of the invention are not limited to any specific method of manufacture, the invention encompasses methods for making bayerite alumina-clad zeolite particles and cracking catalysts containing bayerite-clad zeolites. In general, the method of forming the bayerite-clad zeolite involves forming an aqueous slurry of aluminum ion-containing solution and the desired zeolite particles contacting the slurry with a strong base to raise the pH to at least 10, and allowing alumina to precipitate onto the zeolite particles while maintaining the high pH condition. More preferably, the deposition pH is at least about 10 to about 11.5 and most preferably from 10 to 11. The resulting bayerite alumina-clad zeolite particles are then preferably recovered, washed and dried. In some cases, it is possible to omit the recovering, washing and/or drying steps depending on the subsequent processing or use of the bayerite-clad zeolite particles.

The formation of the initial slurry and subsequent deposition may be performed in a batch or continuous mode. The batch process preferably involves (a) combining zeolite particles and water to form an aqueous slurry, (b) adding an aluminum acid salt (preferably aluminum sulfate) solution to the zeolite slurry, and (c) combining the zeolite slurry from step (b) with a base (preferably alkali metal hydroxide such as NaOH or an alkali metal aluminate such as sodium aluminate) in proportions to achieve a mix pH of at least about 10 whereby bayerite alumina is precipitated onto the zeolite particles. The above steps are continued until the desired amount of bayerite-coated zeolite has been prepared.

After the precipitation ahas been completed, the pH of the slurry containing the bayerite-clad zeolite particles is preferably reduced by addition of an acid, such as $H_2SO_4$, to facilitate salt removal from the resultant slurry of bayerite-clad zeolite particles. Preferably, the resulting pH is about 9 or less.

Alternately, the bayerite clad zeolite can be formed by acidifying a slurry of zeolite and sodium aluminate maintained at an elevated temperature of up to about 120° F. (49° C.), such as from about 90° to 120° F. (33° to 49° C.). The precipitation of bayerite is conducted by contacting the slurry with $CO_2$ (e.g. bubbling the $CO_2$ through the slurry) until the slurry has attained a pH of from about 10 to 11. Precipitation of bayerite from sodium aluminate by $CO_2$ acidification in the absence of zeolite is known (See American Chemical Society Monograph 184, Misra, at Page 14 (1986))

The bayerite-clad zeolite particles produced by either process are then recovered by filtration. The particles are preferably washed and dried. The washing step can be a simple water wash to remove unwanted salts. The washing can alternately be accomplished by simply passing water (ambient to 80° C., preferably 60° to 80° C.) through the filter cake or taking up the particles in water and refiltering. The drying is preferably done by spray drying. In some circumstances, the washing may be omitted if the residual cation content of the clad particles after filtration is sufficiently low. Also, the drying step may be omitted where the moisture content of the washed particles does not adversely impact subsequent processing (e.g., incorporation into a FCC catalyst particle).

In the above process, alumina is contributed both by the aluminum acid salt and, when used, by the sodium aluminate. The concentration of the aluminum acid salt, sodium aluminate and zeolite particles will thus determine the amount of alumina deposited on average per particle. The aluminum acid salt is preferably an aluminum sulfate-containing salt, such as $Al_2(SO_4)_3 \cdot 18H_2O$. Typically, an aluminum sulfate solution which effectively containing about 2–8 wt. % $Al_2O_3$ is used in step (b), more preferably about 6.5–7.7 wt. % $Al_2O_3$. The concentration of aluminum sulfate in the slurry resulting from step (b) will depend in part on the desired amount of alumina deposition, the concentration of zeolite particles, and the total volume of the slurry. Preferably, the concentration of aluminum sulfate in the slurry of step (b) is such that the slurry liquid has an effective alumina content of about 1 to 8 wt. %, preferably from about 5 to 8 wt. %. In general, moderate concentrations are preferred in as much as they allow better process control (e.g., avoidance of premature precipitation, homogeneous precipitation, etc.).

The zeolite may be any particulate zeolite which is sufficiently stable under the basic processing conditions of the cladding process. The zeolite is preferably one which is useful to catalyze the cracking of hydrocarbons in the absence of added hydrogen. Preferred zeolites are those mentioned above. The starting zeolite particles preferably have a particle size which is amenable to slurry processing and subsequent incorporation of the resulting particles into a FCC catalyst. The concentration of zeolite particles in the slurry may vary considerably. In general, excessively high concentrations are not preferred in as much as adequate dispersion of the zeolite becomes difficult. On the other hand, excessively low concentrations provide low volume throughput of clad zeolite product. In general, the concentration of zeolite in the slurry resulting from step (b) is preferably about 30–50 wt. % based on the total amount of water in that slurry.

The strong base of the basic solution should be of sufficient concentration that it is capable of raising the pH of the step (c) mixture to the desired level. For example, the aluminate solution preferably has an effective alumina concentration of about 15–25 wt. % and a molar ratio of $Na_2O:Al_2O_3$ of about 1.3 to 1.6, more preferably from about 14 to 1.5. If desired, another suitable base (e.g., alkali metal hydroxide or ammonia) may be substituted for the sodium aluminate solution, however sodium aluminate is preferred.

The bayerite-clad zeolite particles may be incorporated into cracking catalyst particles using conventional techniques such as those disclosed in U.S. Pat. Nos. 3,650,988; 3,912,619 and 3,957,689, the disclosures of which are incorporated hereby in their entirety by reference.

The cracking catalysts of the invention, which contain bayerite-clad zeolite particles, are especially useful in conventional FCC processes or other catalytic cracking processes where hydrocarbon feedstocks are cracked into lower molecular weight compounds in the absence of added hydrogen. Typical FCC processes entail cracking a hydrocarbon feedstock in a cracking zone in the presence of cracking catalyst particles which particles are subsequently passed to a regenerator where the catalyst particles are regenerated by exposure to an oxidizing atmosphere. The regenerated particles are then circulated back to the cracking zone to catalyze further hydrocarbon cracking. In this manner, an inventory of catalyst particles is circulated between the cracking zone and the regenerator during the overall cracking process. Typical FCC processes involve cracking temperatures of about 450 to 600° C., preferably from about 500 to 580° C. with catalyst regeneration temperatures of from about 600 to 800° C.

The catalyst particles may be added to the circulating catalyst particle inventory while the cracking process is underway or they may be present in the inventory at the start-up of the FCC operation. The catalyst particles may be added directly to the cracking zone, to the regeneration zone of the cracking apparatus or at any other suitable point. If desired, the cracking catalyst of the invention may be used in combination with other cracking catalysts and/or with conventional additive admixture particles such as SOx reduction additives, metals passivation additions, etc. As with any cracking catalyst, the amount of catalyst used in the cracking process will vary by FCC unit, feedstock, operating conditions and desired output as is well known in the art.

The catalysts of the invention may be used to crack any typical hydrocarbon feedstock. The bayerite alumina-clad zeolite cracking catalysts are especially useful for cracking heavy petroleum feedstocks such as resids, deep cut vacuum gas oils, etc. The feedstock may contain 10 percent or greater hydrocarbon components having a boiling point of above 1000° F.(540° C.) with 1.5 percent or greater concarbon content.

The bayerite alumina-clad zeolite containing cracking catalysts have expectedly been found to minimize formation of coke and to provide enhanced cracking of petroleum bottoms to thus provide higher yields of desired products.

The following examples are presented for illustrative purposes and are not meant to be a limitation on the invention, as defined by the appended claims. All parts and percentages are by weight unless otherwise indicated.

Further, any range of numbers recited in the present specification or claims, such as that representing a particular set of properties, units of measure, conditions physical states or percentages, is intended to literally incorporate expressly herein by reference or otherwise, any number falling within such range, including any subset of numbers within any range so recited.

EXAMPLE 1

Preparation of Bayerite Alumina-Clad USY Zeolite 4000 parts (dry basis) of USY zeolite was slurried into 6522 parts of water. To this slurry was added 3333 parts of an aluminum sulfate solution containing 7.66 wt. % $Al_2O_3$. This was referred to as alum/USY slurry. 20 parts of magnesium hydroxide slurry (40% MgO) was dissolved in 18,000 parts of water at 160° F. in a 10 gallon steam-jacketed tank. This was referred to as the heel. The heel water was circulated through a three-stream mix-pump and back into the 10 gallon tank at the rate of 1400 parts/min. The other streams to the mix-pump were a sodium aluminate solution, containing 21% $Al_2O_3$ and 19% $Na_2O$ and the alum/USY slurry. The flow rate of the sodium aluminate solution was set at 60 parts/min, and the flow rate of the alum/USY slurry was adjusted to maintain the pH at 10.7. Alumina precipitation was continued until about 20% alumina has been clad on the USY. At the end of precipitation, sufficient 20% $H_2SO_4$ solution was added to the slurry to bring the pH to 9.0 to facilitate salt removal. The slurry was aged for 3 hours at 160° F., filtered and washed with 40 gallons of water at 160° F. The washed filter cake was oven dried overnight at 180° F.

Figure 2:
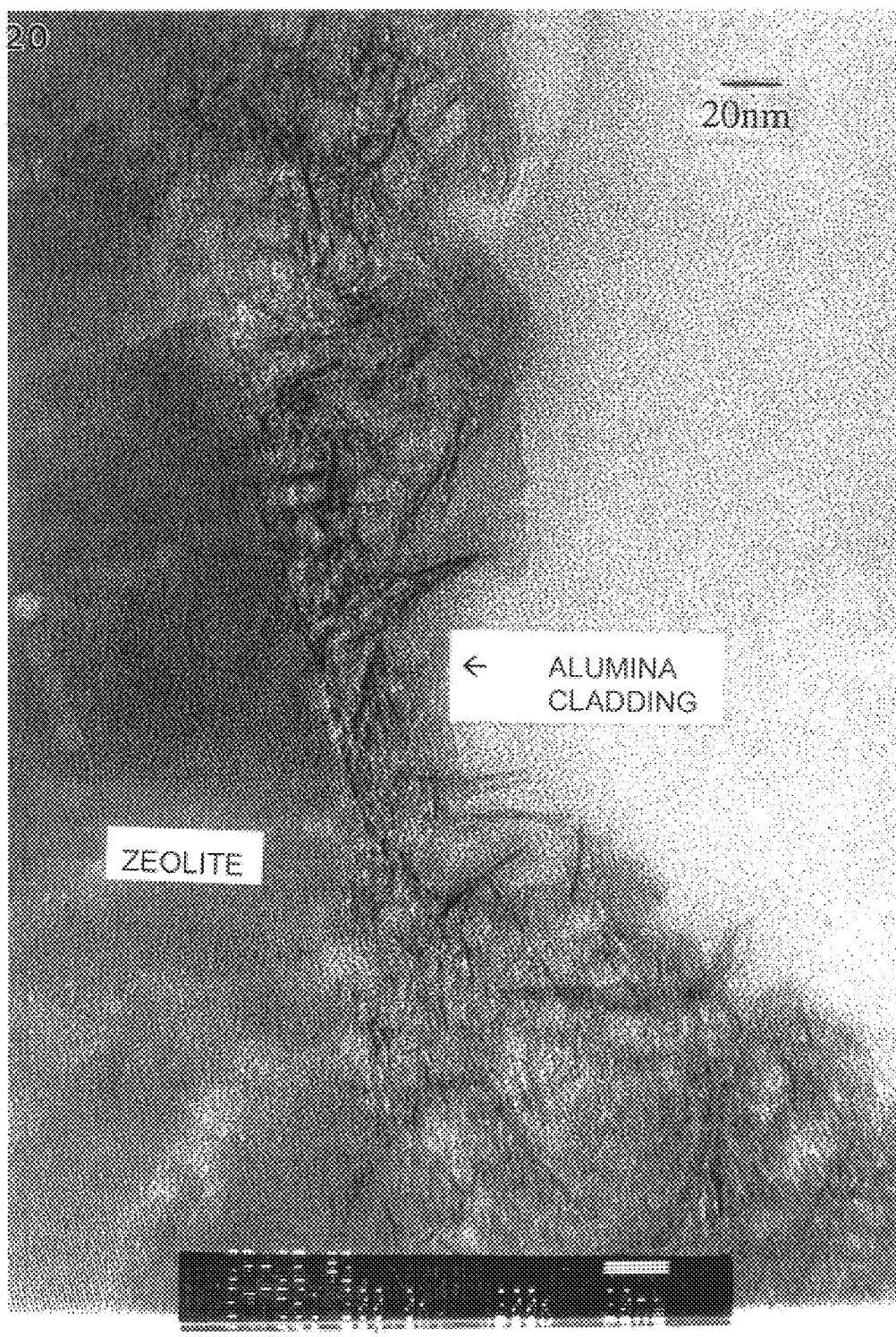
FIG. 2 is a second picture of the product of Example 1 obtained by TEM technique showing a portion of a zeolite particle (left dark portion of picture) with bayerite alumina cladding thereon. The scale of the picture is 1 cm represents 20 nm.

The resulting product was examined by X-ray diffraction using a longer exposure time revealing the presence of bayerite phase alumina. The coating thickness can be seen from the pictures obtained using transmission electron microscopy (TEM) that are shown in FIGS. 1 and 2.

Comparison Example

Preparation of Pseudoboehmite-Clad USY 4000 parts (dry basis) of USY was slurried in 16255 parts of water at 120° F. in a 10 gallon tank. An aluminum sulfate solution (7.66% $Al_2O_3$) was added to the slurry to bring the pH to 4.2. A heel was formed as indicated in Example 1 above and circulated through a three-stream mix-pump at 1400 parts/min. A sodium aluminate solution (21% $Al_2O_3$ and 19% $Na_2O$) and an aluminum sulfate solution (7.66% $Al_2O_3$) are added to the mix-pump. The sodium aluminate was added at 30 parts/min, and the flow rate of the aluminum sulfate was adjusted to maintain the pH at 7.5. When about 20% alumina has been added to the USY zeolite, the pH was raised to 9 by pumping in additional sodium aluminate. The slurry was aged for 3 hours at 120° F., filtered and washed with 40 gallons of water. The washed filter cake was oven dried overnight at 180° F.

MAT Testing

Each of the alumina-clad zeolites formed according to Examples 1 and Comparison Example above were used to produce particulate cracking catalyst compositions containing 40 wt. % of the alumina-clad zeolite, 20 wt. % silica sol, and 40 wt. % clay. Properties of the catalysts are shown in Table 1. The catalysts were each impregnated with 2000 ppm Ni and 3000 ppm V and subjected to Cyclic Propylene Steam (CPS). Detailed CPS deactivation procedure can be found in ACS Symposium Series 634, p.171–183 (1996). The resulting particles were then used to crack a resid feedstock in a standard MAT test (ASTM D3907-87). The results indicated that the catalyst containing bayerite-clad zeolite (Example 1) produced lower bottoms and less hydrogen and less coke (Table 2).

TABLE 1

|  | Example 1 | Comparison Example |
|---|---|---|
| Analyses: |  |  |
| % Na2O | 0.31 | 0.28 |
| % Al2O3 | 33.46 | 33.65 |
| % RE2O3 | 1.99 | 2.03 |
| % SO4 | 0.39 | 0.52 |
| Davison Index | 1 | 9 |
| Bulk Density (cm3/g) | 0.76 | 0.78 |
| Zeolite Area (m2/g) | 196 | 190 |
| Matrix Area (m2/g) | 96 | 82 |
| Avg. Particle Size (microns) | 83 | 80 |
| 5000 ppm Metals CPS |  |  |
| Zeolite Area (m2/g) | 131 | 121 |
| Matrix Area (m2/g) | 42 | 46 |
| Unit Cell Size (Angstroms) | 24.26 | 24.27 |
| Ni (ppm) | 2178 | 2157 |
| V (ppm) | 3020 | 3000 |

TABLE 2

|  | Example 1 | Comparison Example |
|---|---|---|
| Wt. Conversion | 75.00 | 75.00 |
| Cat/Oil | 4.46 | 4.77 |
| Wt. Yields |  |  |
| H2 | 0.58 | 0.70 |
| C1 | 1.17 | 1.27 |
| Total C1 + C2 | 2.76 | 2.98 |
| C3 = | 4.33 | 4.48 |
| Total C3s | 5.27 | 5.41 |
| Isobutylene | 1.67 | 1.71 |
| Total C4 = | 14.03 | 14.59 |
| iC4 | 3.01 | 3.09 |
| Total C4s | 9.91 | 9.98 |
| C5 + Gaso | 50.06 | 48.38 |
| LCO | 20.33 | 19.95 |
| 640 + Btms | 4.67 | 5.05 |
| Coke Wt. Feed | 6.42 | 7.53 |

What is claimed is:

1. A zeolite-containing particle comprising a crystalline zeolite having a coating on its surface, said coating comprising bayerite-phase alumina.

2. The product of claim 1 wherein said coating forms about 5 to about 50 weight percent of the particle.

3. The product of claim 1 wherein the coating has a thickness of from about 5 to 100 nm.

4. The product of claim 1, 2 or 3 wherein said zeolite is selected from the group consisting of zeolites of type Y, USY, CREY, REY and mixtures thereof.

5. The product of claim 4 wherein said coating consists essentially of bayerite phase alumina.

6. The product of claim 5 wherein the zeolite is a Y type zeolite.

7. The product of claim 1 wherein said bayerite phase alumina forms at least 50 weight percent of said coating.

8. The product of claim 7 wherein the zeolite is a Y type zeolite.

9. A particulate cracking catalyst suitable for use in fluid catalytic cracking of petroleum feedstocks, said catalyst comprising particles of crystalline zeolite having a coating on the surface of the particles comprising bayerite phase alumina.

10. The cracking catalyst of claim 9 wherein said catalyst contains about 10 to about 80 weight percent of said bayerite-alumina coated zeolite particles.

11. The cracking catalyst of claim 9 wherein said zeolite is selected from the group consisting of zeolites of type Y, USY, CREY, REY and mixtures thereof.

12. The cracking catalyst of claim 9 wherein said bayerite phase alumina forms at least 50 weight percent of said coating.

13. The cracking catalyst of claim 9 wherein said coating consists essentially of bayerite phase alumina.

14. The cracking catalyst of claim 12 wherein the zeolite is a Y type zeolite.

15. The cracking catalyst of claim 13 wherein the zeolite is a Y type zeolite.

16. The cracking catalyst of claim 9 wherein the catalyst contains about 30 to about 70 weight percent of said zeolite.

17. The cracking catalyst of claim 15 wherein the catalyst contains about 30 to about 70 weight percent of said zeolite.

18. A method of forming bayerite alumina coated zeolite particles comprising forming an aqueous slurry having an acidic pH of less than 7 comprising aluminum ion-containing solution and zeolite particles, contacting said slurry with an aqueous solution of a strong base at a concentration to cause the resultant slurry to have a pH of at least 10, and allowing bayerite alumina to precipitate onto the zeolite particles.

19. The method of claim 18 wherein the bayerite alumina-coated zeolite particles are separated and washed with water.

20. The method of claim 18 wherein the resultant slurry has a pH of from at least about 10 to about 11.5.

21. The method of claim 18, 19 or 20 wherein the aluminum ion containing solution comprises an aqueous solution of aluminum sulfate.

22. The method of claim 18, 19 or 20 wherein the aluminum ion containing
solution, the zeolite particles and the base are contacted substantially simultaneously.

23. The method of claim 18 wherein the base is selected from alkali metal hydroxide, ammonium hydroxide, or alkali metal aluminate.

24. The method of claim 18 wherein the base is sodium aluminate.

25. A method of forming bayerite alumina coated zeolite particles comprising forming an aqueous slurry having an alkaline pH of greater than about 12 comprising aluminum ion-containing solution and zeolite particles, contacting said slurry with carbon dioxide for a sufficient time to cause the resultant slurry to have a pH of from about 10 to 11.5, and allowing bayerite alumina to precipitate onto the zeolite particles.

26. The method of claim 25 wherein the bayerite alumina-coated zeolite particles are separated and washed with water.

27. A bayerite alumina-coated zeolite particulate product formed by initially mixing a solution of an aluminum ion source with a slurry of zeolite to provide a slurry having a pH of less than 7, contacting the resultant slurry with a strong basic material in sufficient amount to cause the resultant slurry to have a pH of at least 10, and allowing bayerite alumina to precipitate onto the zeolite particles.

28. The product of claim 27 wherein the bayerite alumina-coated zeolite particles are separated and washed with water.

29. The product of claim 27 wherein the resultant slurry has a pH of from at least about 10.5 to about 11.5.

30. The product of claim 27 wherein the base is selected from alkali metal hydroxide, ammonium hydroxide, or alkali metal aluminate.

31. The product of claim 27 wherein the base is sodium aluminate.

32. The product of claim 27 wherein said zeolite is selected from the group consisting of zeolites of type Y, USY, CREY, REY and mixtures thereof.

33. The product of claim 32 wherein the zeolite is a Y type zeolite.

34. The product of claim 27 wherein the zeolite is a Y type zeolite.

35. A bayerite alumina coated zeolite particles formed by initially forming an aqueous slurry having a pH of at least about 12 comprising aluminum ion-containing solution and zeolite particles at an elevated temperature of up to 49° C., contacting said slurry with $CO_2$ to cause the resultant slurry to have a pH of at least 10, and allowing bayerite alumina to precipitate onto the zeolite particles.

36. The product of claim 35 wherein the bayerite alumina-coated zeolite particles are separated and washed with water.

37. The product of claim 35 wherein the resultant slurry has a pH of from at least about 10 to about 11.

38. The product of claim 37 wherein the slurry is maintained at a temperature of from about 33° to 49° C.

39. The product of claim 35 wherein the aluminum ions are provided by alkali metal aluminate.

40. The product of claim 39 wherein the alkali metal aluminate is sodium aluminate.

41. The product of claim 39 wherein the zeolite is a Y type zeolite.

42. The product of claim 39 wherein the slurry is maintained at a temperature of from about 33° to 49° C.

43. The product of claim 35 wherein said zeolite is selected from the group consisting of zeolites of type Y, USY, CREY, REY and mixtures thereof.

44. The product of claim 35 wherein the zeolite is a Y type zeolite.

45. The product of claim 35 wherein the slurry is maintained at a temperature of from about 33° to 49° C.

46. A process for fluidized catalytic cracking of a hydrocarbon feedstock wherein (i) said feedstock is cracked in a cracking zone in the presence of cracking catalyst particles, (ii) said cracking catalyst particles are regenerated in a regeneration zone, and (iii) an inventory of particles, including cracking catalyst particles, is repeatedly circulated between the cracking zone and the regeneration zone, wherein the improvement comprises having said inventory comprise zeolite containing particles having a coating comprising bayerite-phase alumina of claim 1, 2, 3 or 7.

47. The process of claim 46 wherein the zeolite containing particles having a coating comprising bayerite-phase alumina comprises zeolite selected from the group consisting of zeolites of type Y, USY, CREY, REY and mixtures thereof.

48. The process of claim 47 wherein the coating of said zeolite containing particles consists essentially of bayerite phase alumina.

49. The process of claim 47 wherein said zeolite is a Y type zeolite.

* * * * *